United States Patent [19]
Hughes

[11] Patent Number: 5,443,389
[45] Date of Patent: Aug. 22, 1995

[54] UNIFIED CONNECTOR INTERFACE

[76] Inventor: Michael T. Hughes, P.O. Box 1379, Berthoud, Colo. 80513

[21] Appl. No.: 91,927

[22] Filed: Jul. 16, 1993

[51] Int. Cl.$^6$ .............................................. H01R 23/02
[52] U.S. Cl. ................................................ 439/35; 439/651
[58] Field of Search ................... 439/34, 35, 650–655, 439/76

[56] References Cited

U.S. PATENT DOCUMENTS

| | | | |
|---|---|---|---|
| 4,718,853 | 1/1988 | Orbanic | 439/52 |
| 4,770,644 | 9/1988 | Feder | 439/35 |
| 4,781,393 | 11/1988 | Jeter | 439/35 |
| 4,842,524 | 6/1989 | Hopkins et al. | 439/651 |
| 4,846,697 | 7/1989 | Rodgers | 439/35 |
| 5,030,938 | 7/1991 | Bondzeit | 340/431 |
| 5,184,960 | 2/1993 | Hopkins et al. | 439/639 |

*Primary Examiner*—Gary F. Paumen
*Attorney, Agent, or Firm*—Rodger H. Flagg

[57] ABSTRACT

A unified connector interface for mounting on a towing vehicle, which is adapted to provide electrical connection with any one of a plurality of towed vehicle wiring harness electrical connectors. The unified connector interface has a housing adapted for securement to the rear of the towing vehicle. The unified connector interface is adapted to receive a selected round connector having a plurality of connectors extending from the towed vehicle wiring harness. The unified connector interface is also adapted to provide an interface between complimentary connectors, and with piggyback double electrical connectors, as well as with individual or two wire connectors. The housing is sized to recieve a circuit board therein, which aligns the connectors on the first side with the connectors on the second side.

23 Claims, 3 Drawing Sheets

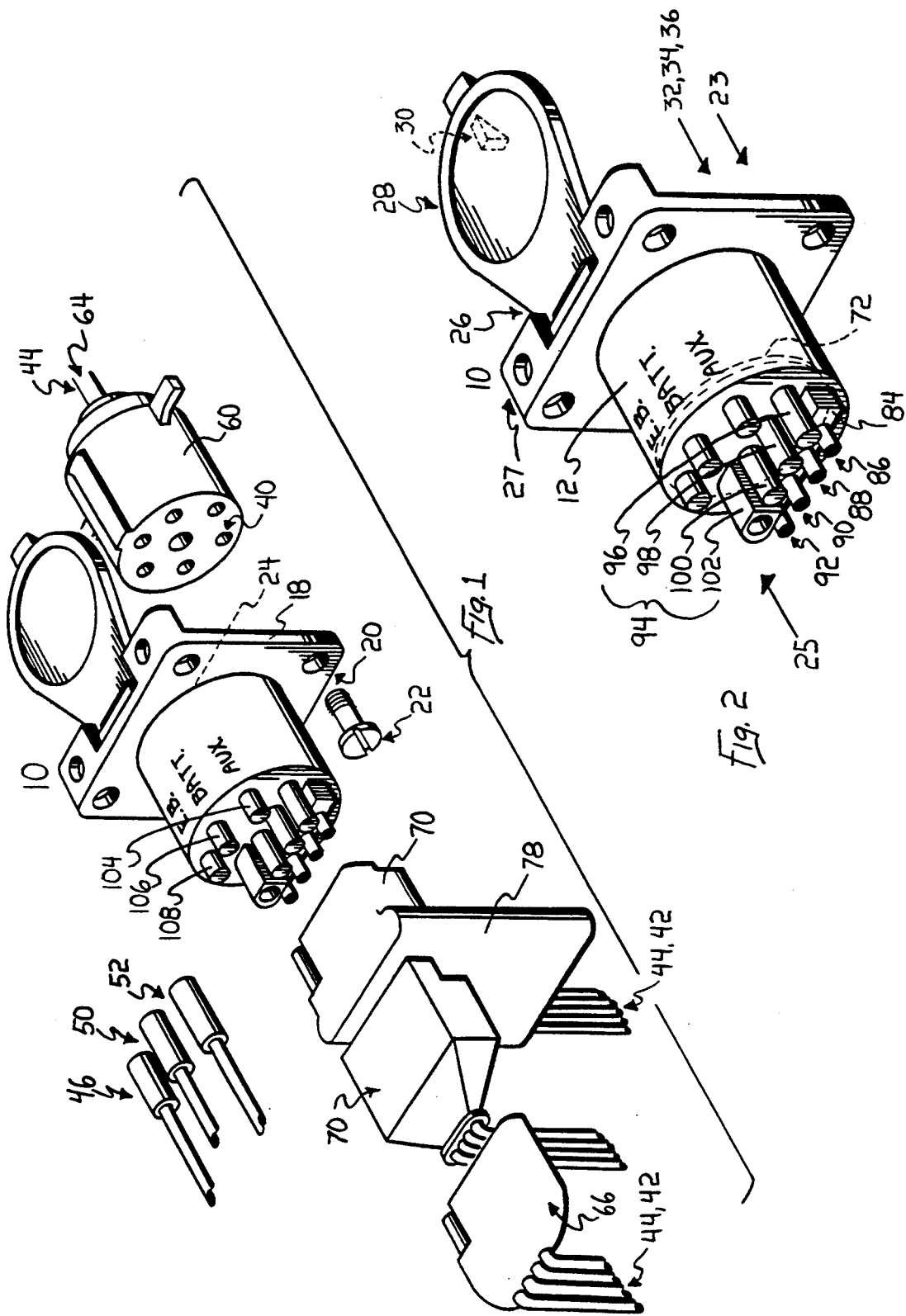

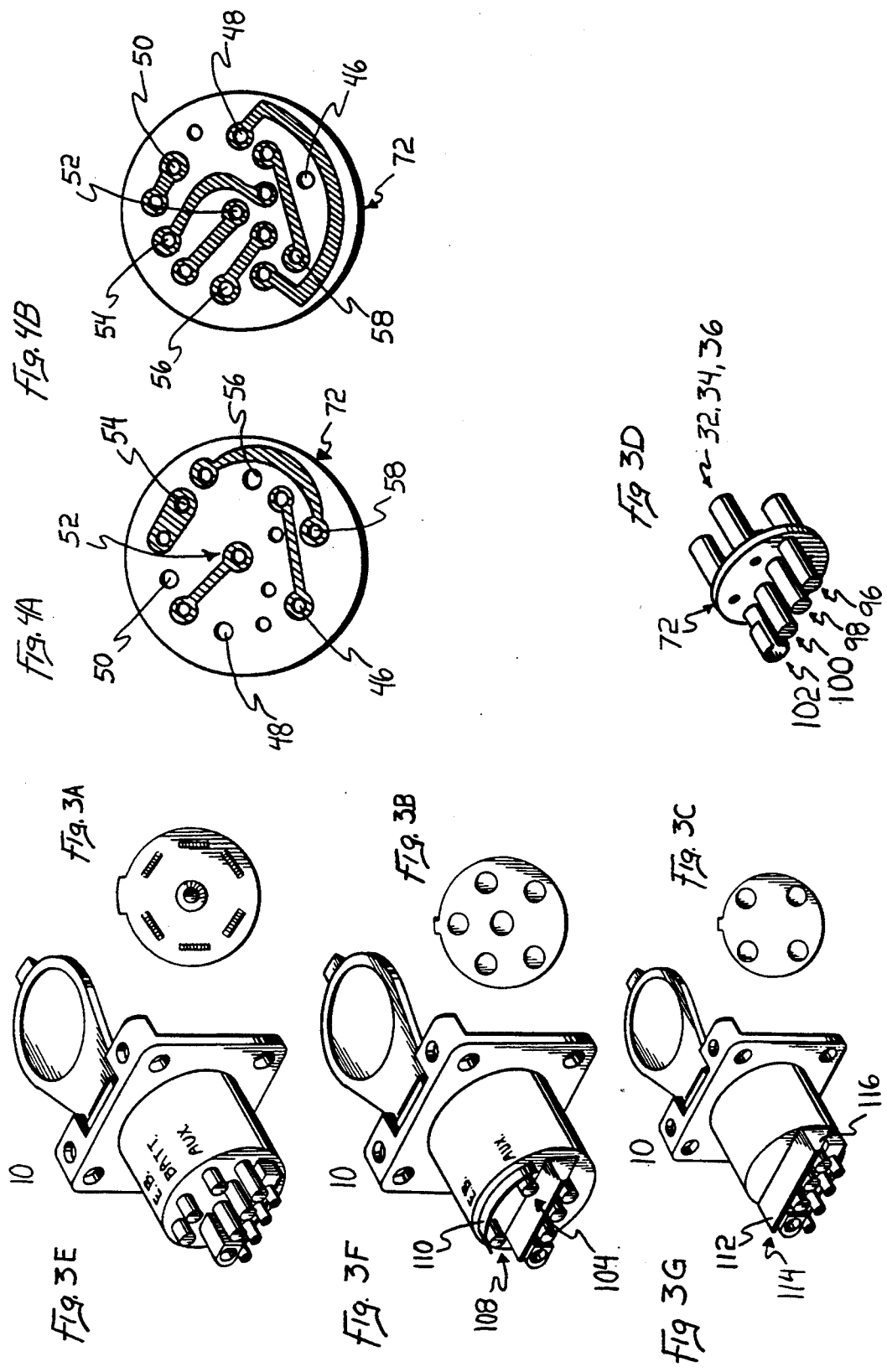

UNIFIED CONNECTOR INTERFACE

BACKGROUND OF THE INVENTION

1. Field of the Invention

The present invention relates to a connector for releasably securing electrical connections between separate vehicles, and more particularly to a unified connector interface apparatus adapted for securement to the rear of a towing vehicle, one end of the unified connector interface to selectively receive a variety of towing vehicle plug configurations, and the opposite end of the unified connector interface adapted for connection with a round vehicle plug adapted to extend from the towed vehicle.

2. Background of the Invention

In recent years, the rising popularity of outdoor recreational activities, such as boating and camping, has led to an increase in the use of trailers, campers, and other towed vehicles. Moreover, many state and federal laws require that towed vehicles have on-board electrical systems for providing brake lights, turn signals, etc. These on-board electrical systems are usually controlled by the electrical system of the towing vehicle, to actuate appropriate electrical signals on the towed vehicle. For example, when the brake lights on the towing vehicle are energized, the brake lights on the towed vehicle are also energized. This is also true for the turn signals, backup lights, etc.

Generally, a hard-wired electrical connection is installed to connect the electrical signals generated on the towing vehicle with responsive electrical signals on the towed vehicle. Hard-wired electrical connections typically include a plurality of mating plug and receptacle connections to enable the user to releasably secure the electrical connection, so that the vehicles may be easily separated when they are not joined together.

Typically, each vehicle includes a wiring harness, to which the mating plug and receptacle connections are secured. Each wiring harness includes a harness connector with male and/or female terminals in a pin and/or blade configuration in order to establish a releasable electrical interconnection between the wiring harness on the towing vehicle with the wiring harness on the towed vehicle.

The towed vehicle typically employs a wiring harness having an array of male pin terminals for releasable insertion into a complimentary array of female pin terminals connected to the wiring harness on the towing vehicle.

Early wiring harnesses comprised relatively simple harness connectors having four terminals arranged in a spaced, linear alignment, mounted in a flat harness connector. Such connectors were sufficient for handling low current requirements of simple electrical systems requiring a connection between the towing vehicle and the towed vehicle for brake lights, turn signal lights and parking lights.

Trailers, campers and other towed vehicles have been rapidly evolving, and are now more sophisticated and larger in size. These towed vehicles are often equipped with a multitude of more complex accessories, such as towed vehicle electric braking systems, separate air conditioners, stove and refrigerators, etc. These additional accessories require higher electrical currents and power, which require heavier and a greater number of electrical interconnections. Electrical harness connectors having six or seven wires are becoming common on both towing and towed vehicles.

In order to conserve space, these larger and more complex wiring harness connectors are being arranged in circular configurations, resulting in round electrical connectors. These round harness connectors are often adapted for use with pin and/or blade, as well as with male/and or female terminal connections. Four, six and seven round terminal connectors are now being used in the trailer industry.

Installation of a seven-way round harness connector on a towing vehicle, requires the threading of seven wires from the towing vehicle's wiring harness into the receiving hole at the back of the connector, then disassembling the connector housing to gain access to an internal seven bank terminal block equipped with seven screw type fasteners. Each fastener is identified numerically, and confusion results in attempting to hook the right wire to the right terminal.

Trailer rental companies, such as U-Hall, have their own double electrical connector type plug, which is not compatible with the conventional four-way flat connector.

The installation of these more complex harness connectors is made more difficult by the variety of connectors now being used. Each time a different vehicle is being towed, a complimentary harness connector must be installed. This requires the replacement, modification or bypassing of the existing wiring harness connectors, to provide complimentary wiring connectors between each of the variety of vehicles being towed.

Pinch-type clamp connectors are often used in a conventional modification procedure. The pinch-type clamp connector is squeezed directly over the wires of the electrical system associated with the towing vehicle. The clamp connector is intended to cut through the insulation of the electric wires to establish an electrical connection. Clamp connectors can cut through or cause the wires to break, thereby damaging the electrical system.

In a conventional bypass technique, the light covers are first removed from the tail lights of the towing vehicle. Then, electrical connections are made by connecting individual electrical wires to the light bulb sockets. This jury-rigging is unsightly, and often destroys the water seal around the light covers, which may lead to damage to the sockets and electrical system. As the vehicles move through a turn, the wires tend to pull against the lens covers, thereby damaging the lens covers.

U.S. Pat. No. 4,781,393 by C. Jeter, issued in Nov. 1, 1988, discloses a trailer light convertor having a conversion box mounted between the towing vehicle and the towed vehicle, wherein jumper adapters are manually moved to adapt to various plug configurations, U.S. Pat. No. 4,718,853 by R. Orbanic, issued in Jan. 12, 1988, discloses a four pole electrical connector having variably positionable switches for selectively connecting various electrical circuits of a first vehicle to corresponding electrical circuits of a second vehicle.

U.S. Pat. No. 5,184,960 by E. Hopkins et al., issued Feb. 9, 1993, discloses a trailer light connection system having a T-shaped connector, utilizing a modularized tap plug.

U S Pat. No. 4,842,524 by R. Hopkins et al., issued Jun. 27, 1989, discloses a T-shaped connector for truck lighting systems having three terminals, utilizing a modularized tap plug, with split wire connectors to simplify system installation.

U.S. Pat. No. 4,846,97, by E. Rodgers, issued Jul. 11, 1989, discloses a cable for interconnecting the lighting systems of a towing vehicle and a trailer, utilizing a plurality of individual wires, each with individual wiring connectors, which are manually positioned to match the layout of the incompatible wiring connector.

U.S. Pat. No. 4,770,644, by E. Feder, issued Sep. 13, 1988 is representative of a seven pin disconnectable, multipole round connector, which requires a complimentary mating connector.

U.S. Pat. No. 5,030,938, by F. Bondzeit, issued Jul. 9, 1991, discloses a universal trailer lighting adapter, which permits connection of four wire American trailers to either American or foreign motor vehicles. Circuitry is current limited to protect the electrical wiring systems of both the motor vehicle and the trailer.

SUMMARY OF THE INVENTION

Therefore, what is needed is an improved wiring harness connector which is adaptable to a variety of incompatible electrical connectors, to provide a unified connecter interface between a towing vehicle and a towed vehicle.

The unified connecter interface apparatus disclosed herein, enables the user to pull a variety of vehicles having incompatible wiring harness connector configurations, without requiring the rewiring of the towing vehicle wiring harness connector or the rewiring of the towed vehicle wiring harness connector. The unified connecter interface provides a complimentary interface between a standard four way flat connector, with a selected round connector, or with a complimentary four way flat connector, depending upon the type of electrical connection on the vehicle to be towed. Piggyback double electrical connectors of the type employed by rental companies, are also adapted for connection to a selected round connector, in accordance with the disclosure provided.

Other features and advantages of the invention will be apparent from the following description with reference to the accompanying drawings which illustrate by way of non-limiting examples several embodiments thereof.

BRIEF DESCRIPTION OF THE DRAWINGS

FIG. 1 is a perspective view of the unified connector interface, showing various connector configurations adapted for connection thereto.

FIG. 2 is an enlarged view of the unified connector interface.

FIG. 3E is a perspective view of a seven way round style unified connector interface, with an end view (3A) of a matable seven pin trailer plug.

FIG. 3F is a perspective view of a six way round style unified connector interface, with an end view (3B) of a matable six pin trailer plug FIG. 3G is a perspective view of a four way round style unified connector interface, with an end view (3C) of a matable four pin trailer plug.

FIG. 3D is a perspective view of a circuit board prior to installation within a unified connector interface.

FIG. 4A is a trailer side view of the interior circuit board of the seven way round style unified connector interface shown in FIG. 3A.

FIG. 4B is a towing vehicle side view of the circuit board of the seven way round style unified connector interface shown in FIG. 3A.

DETAILED DESCRIPTION OF THE PREFERRED EMBODIMENTS

Figure 5:
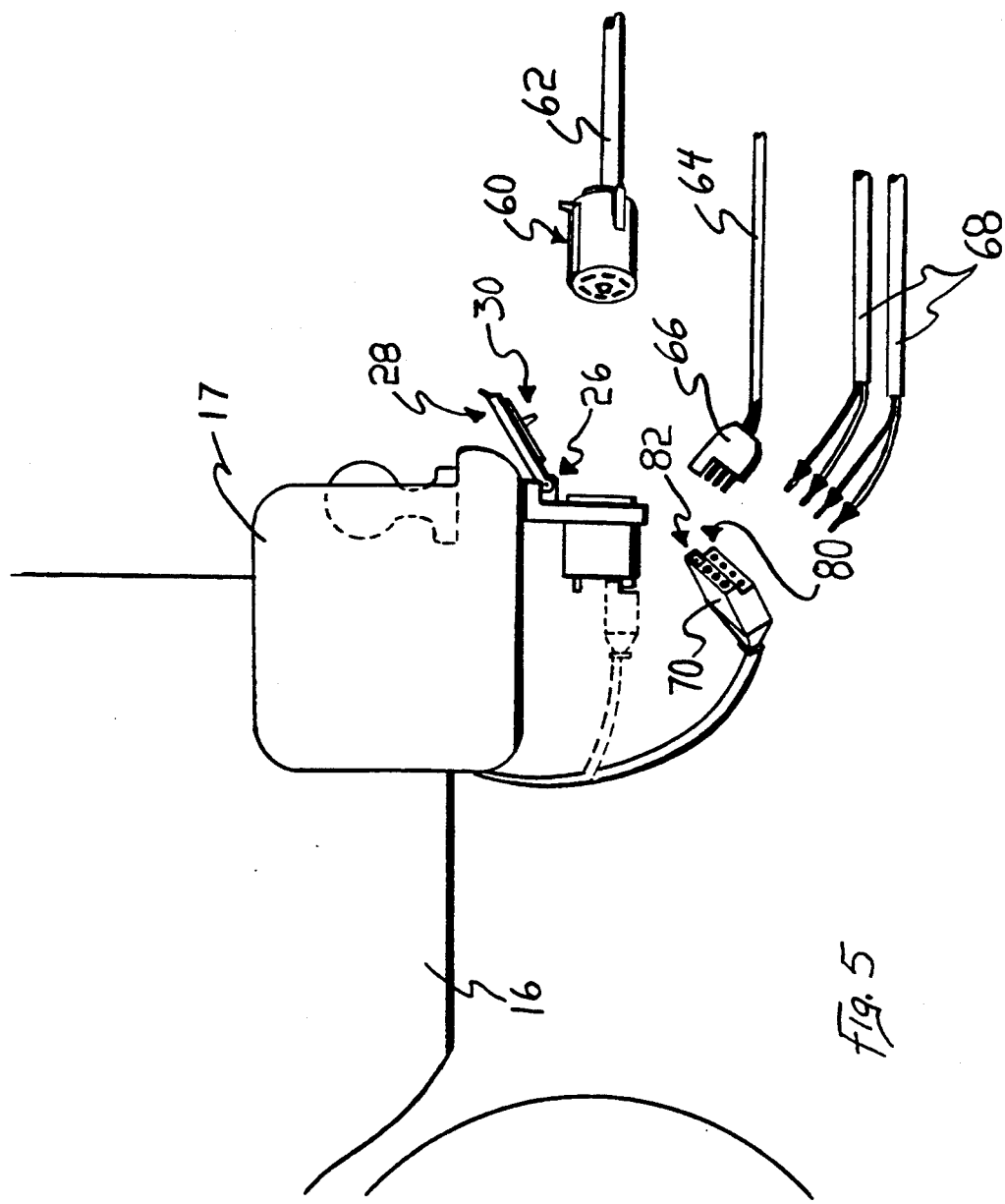
FIG. 5 is side view of the unified connector interface mounted on the rear of a towing vehicle, showing a plurality of trailer connections.

As best shown in FIG. 1 and 2, the unified connector interface apparatus 10 comprises a housing 12, having a first end 23 and a second end 25. The housing 12 preferably includes a means for securing the unified connector interface 10 to the towing vehicle 16. A flange 18, preferably extends from the housing 12. The flange 18 preferably has at least one aperture 20, sized to closely receive a suitable fastener 22 therethrough, for ease of securement of the housing 12 to the rear portion of the towing vehicle 16, in proximity to the rear bumper 17. The flange 18 may have a right angle configuration, to enable the housing to be mounted parallel to the ground, while secured to a horizontal or vertical surface on the towing vehicle.

Other suitable means for securing the unified connector interface 10 to the towing vehicle 16 may also be used, such as welding, or adhesive bonding, without departing from this disclosure, or from the cope of the following claims.

The housing 10 has a first end 23 having a round connector receptacle portion 24 sized to substantially receive a selected round connector 40 therein. A hinged 26 cover 28 is preferably positioned adjacent to the first end 23 of the housing 12 to cover the round connector receptacle 24 when the unified connector interface 10 is not in use.

When the hinged cower 28 is opened, an external round connector 40 of a selected size may be inserted into the round connector receptacle 24. When fully inserted, the hinged lid 28 preferably engages a catch 30 mounted on either the hinged cover 28 or the round connector 40, to resist removal of the round connector 40 during use.

The first end 23 of the unified connector interface 10 housing 12 includes a plurality of electrical connectors 32, which may be either male pins 34 or complimentary female receptacles 36. For purposes of this disclosure, reference to male pins 34 and female receptacles 36 includes both pins and blades and other known forms of electrical connectors.

Preferably, the electrical connectors 32 comprise male pins 34 sized to receive complimentary female receptacles 40 which are connected to a wiring harness 44 extending from the towed vehicle 18.

Alternately, the electrical connectors may be female receptacles 36 sized to receive complimentary male pins 38, which are connected to a suitable wiring harness 44 extending from the towed vehicle 18.

Preferably, the electrical connectors 32 on the first end 23 are positioned in a circular configuration, similar to those shown in FIG. 3E through 3G. Although four, six and seven way round connectors are illustrated, it is within the scope of this disclosure to include a plurality of round connector configurations, such as five way, eight way, nine way, ten way, eleven way, twelve way, etc. round connectors. Such plurality of round connector configurations may be readily adapted by one of skill in this art, in accordance with the teaching of this invention, and such plurality of round plug configurations are intended to fall within the scope of the following claims.

Electrical wires 42, preferably in the form of a wiring harness 44, connect the electrical signals generated on the towing vehicle with selected pins 34 or receptacles 36 on the unified connector interlace 10 to provide responsive electrical signals on the towed vehicle. The electrical wires 42 are preferably color coded and/or labeled for ease of identification and assembly.

The housing 10 is preferably made of aluminum for strength and corrosion resistance. Other materials, such as metal or plastic, may also be used for housing 10, to suit manufacturing preference. A mounting flange 18 is preferably positioned in proximity to the first end 23 of the housing 12. The flange 18 may include additional tabs 27 extending at right angles from the top of the flange 18, for ease of securement of the housing 12 to the towing vehicle 16.

The housing 12 extends from the first end 23 a length sufficient to receive a round connector receptacle 24 substantially therein. A circuit board 72 disposed within the connector receptacle 24 preferably provides electrical connection between the electrical connectors 32 positioned in relation to the first end 23, with the electrical connectors positioned in relation to the second ed 25, as shown in FIG. 3D, 4A and 4B. The circuit board provides continuity between the first end round connector 32 and the connectors 94 disposed on the second end 25.

The second end 25 of the unified connector interface 10 housing 12, has a plurality of electrical connectors, in the form of male pins 34, or female receptacles 36. Preferably, the second end 25 of the unified connector interface 10 comprises a combination of both male pins 34 and female receptacles 36.

In addition, there may be a first raised connecting portion 84 preferably including four male "Dummy Pins" 92, 90, 88 and 86 disposed in spaced linear, alignment in proximity to four electrical connectors 96, 98, 100 and 102. A connection portion located in spaced relation above or below the first raised connection portion 84 preferably includes a combination of male pins 34 and female receptacles 36, disposed in offset spaced linear alignment above or below the first raised connection portion 84 on the second end 25 of the housing 12.

Preferably, the first raised connection portion 84 comprises four male dummy's 86, 88, 90, 92; and the electrical connection portion 94 comprises three adjacent male pins 96, 98, 100 and one female receptacle 102 disposed in spaced parallel alignment. The male dummy's on the first raised connection portion 84 are preferably disposed in offset, parallel alignment with the male pins 96, 98, 100 and female receptacle 102 disposed on the electrical connection portion 94. Alternately, a second embodiment may not included the described first raised connection portion 84. Only the electrical connection portion 94 would be used.

Three additional pins 104, 106, 108 are positioned in offset alignment in spaced relation above or below the second recessed connection portion 94. The male dummy's on the first raised connection portion 84 and the electrical connectors on the electrical connection portion 94 are positioned to receive a double electrical connector 70, such as used by many trailer rental companies. The electrical connector portion 94 is adapted to also align and engage a four way flat connector 66.

The double electrical connector 70 may also include an internal electronic circuit 78 to control independent amber rear turn signals. Alternately, an internal electric circuit may be located with the housing 12, to control independent amber rear turn signals.

As shown in FIG. 3F and 3G, a first guard 110 extends in spaced relation above the additional pins 104, 108 on the second end 25 of the unified connector interface housing 12. The first guard 110 is preferably arcuate, or curved, and extends near the height and combined width of pins 104, 106, 108 to protect all three pins 104, 106, 108 from damage.

A second guard 112 extends at least the height and combined width of pins 96, 98, 100 and female receptacle 102 to protect all three pins 96, 98, 100 and the female receptacle 102 from damage.

Preferably, the second guard 112 has opposed, depending sides 114, 116, which extend along both ends of the first raised connection portion 84 and the electrical connection portion 94.

As best shown in FIG. 5, the unified connector interface 10 is secured to the towing vehicle 16 in proximity to the rear bumper 17.

The hinged cover 28 on the first end 23 of housing 12 is raised to accept a complimentary round connector 60 extending from a suitable wiring harness 62 having electrical wires 64 in electrical communication with the towed vehicle 18. The round electrical connector 24 extending from the towed vehicle 18 preferably engages a catch 30 mounted on the hinged cover 28, to resist disengagement due to twisting, vibration, etc., during use.

If the electrical wires 64 extending from the towed vehicle are connected to a four way flat connector 66, the four way flat connector 66 may be plugged directly into the double electrical connector 70, to provide electrical communication between the towing vehicle and the towed vehicle.

If the electrical wires 64 extending from the towed vehicle 18 are paired wires 68, or single wires 64, these wires 64 may be plugged directly into the double electrical connector 70, bypassing the round electrical connector 32 secured to the rear of the towing vehicle 16. In this way, the universal connector interface 10 disclosed herein, is adaptable for selective connection with 90 percent of all towed vehicles in the United States of America.

When not in use, the offset connector 70 may be plugged into the rear of the round connector housing 12, to eliminate hanging wires extending from the towing vehicle 16, and to protect the complimentary pins or blades 34, 38 or receptacles 36, 40 from the elements.

The double electrical connector 70 preferably has a recessed socket connector 80, and an extended socket connector 82. The double electrical connector 70 is sized for complimentary alignment with the second side of the unified connector interface 10 housing 12, having a first raised connection portion 84 with four male dummy's 86, 88, 90, 92 in spaced, linear alignment, and a second recessed connection portion 94 having three pins 96, 98 100 and a female receptacle 102 arranged in offset, linear spaced alignment. The four male dummy's 86, 88, 90, 92 are positioned in spaced parallel alignment with the three pins 96, 98, 100 and the female receptacle 102.

As shown in FIG. 3E, a seven way round style connector interface, preferably ha electrical wires 64 which are color coded to form a wiring harness 62. In the preferred embodiment, a "white" wire ground connection 46; a "red" wire left turn/brake signal connection 48; a "green" wire running lights connection 50; a "yellow" wire center auxiliary connection 52; a "black" wire battery charger connection 54; a "brown" wire right turn/brake signal connection 56; and a "blue" wire electric brake connection 58, are used. Other known means of wire identification, such as different color combinations, indicia, symbols, letters or numbers may be used without departing from the scope of this invention, or from the following claims.

Preferably, suitable indicia, such as numbers, letters or symbols are located on the housing 12 to identify each electrical connector 104, 106, 108.

The six way round style connector interface 10 shown in FIG. 3F is preferably similar to the seven way round style connector interface 10 shown in FIG. 3E, with the elimination of one electrical connector 106.

The four way round style connector interface 10 shown in FIG. 3G is preferably similar to the seven way round style connector interface 10 shown in FIG. 3E, with the elimination of three of the electrical connectors 104, 106, 108, such as the center "yellow" wire auxiliary circuit connection 52, the "black" wire battery charger connection 54, and the "blue" electric brake connection 58.

Thus, while the novel unified connector interface has been fully disclosed and described herein, numerous modifications and adaptations will become readily apparent to one of ordinary skill in this art, and such adaptations and modifications are intended to be included within the scope of the following claims.

I claim:

1. A unified connector interface apparatus, comprising:
    a) an electrical connector housing having a first end, and a second end;
    b) a circular receptacle at the first end of the housing, the receptacle having a plurality of first electrical connectors mounted in a generally circular configuration within the receptacle;
    c) a plurality of second electrical connectors extending from the second end of the housing, with four of said second electrical connectors arranged in linear spaced alignment on a first connector portion, and a second connector portion having at least one said second electrical connector extending in spaced offset alignment from the first connector portion; and
    d) electrical circuitry located within the housing to interconnect the first electrical connectors located in the circular receptacle at the first end of the housing with the electrical connectors having a similar function located at the second end of the housing.

2. The unified connector interface apparatus of claim 1, wherein a means for securing the connector housing to a towing vehicle comprises a mounting flange extending between the first end and the second end of the housing, the mounting flange having at least one aperture, the aperture sized to receive a suitable fastener therethrough.

3. The unified connector interface apparatus of claim 1, wherein a hinged cover is secured adjacent to the first end of the housing, to cover the circular receptacle when the cover is closed, and to provide access to the electrical connectors located within the circular receptacle when the hinged cover is opened.

4. The unified connector interface apparatus of claim 1, wherein a linear raised connector portion in proximity to the four electrical connectors on the second end of the housing are aligned in parallel alignment to releasably engage a standard 8 terminal connector.

5. The unified connector interface apparatus of claim 1, wherein the circular receptacle having a plurality of electrical connectors mounted in a circular configuration on the first end of the housing, is sized to receive a seven-way round plug configuration.

6. The unified connector interface apparatus of claim 1, wherein the circular receptacle having a plurality of electrical connectors mounted in a circular configuration on the first end of the housing, is sized to receive a six-way round plug configuration.

7. The unified connector interface apparatus of claim 1, wherein the circular receptacle having a plurality of electrical connectors mounted in a circular configuration on the first end of the housing, is sized to receive a four-way round plug configuration.

8. The unified connector interface apparatus of claim 1, wherein the circular receptacle having a plurality of electrical connectors mounted in a circular configuration of the first end of the housing is sized to receive a nine way round plug configuration.

9. The unified connector interface apparatus of claim 1, wherein selected one of said electrical connectors are male pins.

10. The unified connector interface apparatus of claim 1, wherein selected one of said electrical connectors are female receptacles.

11. The unified connector interface apparatus of claim 1, wherein an eight way connector plug is plugged into the first connector portion and the second connector portion located on the second end of the housing, to protect these electrical connectors against the elements between use.

12. The unified connector interface apparatus of claim 1, wherein indicia on the housing serves to identify the electrical connectors disposed thereon.

13. The unified connector interface apparatus of claim 1, wherein the internal circuitry comprises a printed circuit board having circuitry on at least one side.

14. A unified connector interface apparatus, which comprises:
    a) an electrical connector housing having a first end and a second end, and a means of securement extending from the housing;
    b) a circular receptacle positioned on the first end of the housing, the circular receptacle having a plurality of first electrical connectors mounted in a generally circular configuration therein;
    c) a plurality of second electrical connector portions positioned on the second end of the housing, with a first said connector portion having three pins and one receptacle disposed in spaced linear alignment thereon; and a second said connector portion having at least one additional electrical connector located in spaced linear alignment from the first connector portion; and
    d) electrical circuitry disposed within the housing to interconnect the electrical connectors located in the circular receptacle at the first end of the housing with the electrical connectors located at the second end of the housing.

15. The unified connector interface apparatus of claim 14, wherein the means of securement extending from the housing comprises a mounting flange having at least one aperture therethrough, the aperture sized to receive a suitable fastener therein.

16. The unified connector interface apparatus of claim 14, wherein the electrical connectors disposed in the circular receptacle located at the first end of the housing are sized to receive a seven-way round plug configuration.

17. The unified connector interface apparatus of claim 14, wherein the electrical connectors disposed in the circular receptacle located at the first end of the housing are sized to receive a six-way round plug configuration.

18. The unified connector interface apparatus of claim 14, wherein the electrical connectors disposed in the circular receptacle located at the first end of the housing are sized to receive a four-way round plug configuration, and the second end of the housing having on, connector portion comprising three electrical connector pins and one electrical connector receptacle disposed in a spaced, linear alignment.

19. The unified connector interface apparatus of claim 14, wherein a hinged cover is secured adjacent to the first end of the housing, the hinged cover closes to cover and protect the plurality of electrical connectors mounted within the circular receptacle, and opens to provide access to the plurality of electrical connectors mounted within the circular receptacle.

20. A unified connector interface apparatus, comprising:
 a) an electrical connector housing having a first end and a second end, with a mounting flange extending from the housing;
 b) a circular receptacle located at the first end of the housing, the circular receptacle having a plurality of electrical connectors mounted in a generally circular configuration therein;
 c) a hinged cover secured adjacent to the first end of the housing to protect the electrical connectors in the circular receptacle when the hinged cover is closed, and to provide access to the electrical connectors in the circular receptacle when the hinged cover is open;
 d) a plurality of electrical connector portions positioned on the second end of the housing, with a first said connector portion having three pins and one receptacle disposed in spaced linear alignment thereon;
 e) a circuit board disposed within the housing to interconnect the electrical connectors located in the circular receptacle at the first end of the housing, with the electrical connectors portions located at the second end of the housing.

21. The unified connector interface apparatus of claim 20, wherein he means of securing the connector housing comprises a mounting flange having a right angle configuration, enabling the housing to be secured parallel to the ground, while mounted to a selected one of a vertical and horizontal surface on the towing vehicle.

22. The unified connector interface apparatus of claim 20, wherein indicia on the housing serves to identify the electrical connectors disposed thereon.

23. The unified connector interface apparatus of claim 20, wherein the first connector portion having three pins and one receptacle is disposed upon a raised connector portion.

* * * * *